United States Patent
Aktas et al.

(10) Patent No.: US 6,459,776 B1
(45) Date of Patent: Oct. 1, 2002

(54) SYSTEM AND METHOD FOR PERSONALIZED MULTIMEDIA MESSAGING

(75) Inventors: Christoph A. Aktas, Sunnyvale; Bernard M. Guillot, Redwood City, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/163,108

(22) Filed: Sep. 29, 1998

(51) Int. Cl.[7] .................................................. H04M 1/64
(52) U.S. Cl. .................................. 379/88.13; 379/88.14; 379/88.16; 379/88.19; 379/88.22; 379/93.15
(58) Field of Search ....................... 379/67.1, 70, 88.01, 379/88.02, 88.11, 88.13, 88.14, 88.15, 88.19, 88.2, 88.21, 88.22, 142.04, 93.15

(56) References Cited

U.S. PATENT DOCUMENTS

| | | | |
|---|---|---|---|
| 5,434,910 A | 7/1995 | Johnson et al. | 379/88.15 |
| 5,671,269 A | 9/1997 | Egan et al. | 379/67.1 |
| 5,727,047 A | 3/1998 | Bentley et al. | 379/93.05 |
| 5,748,709 A | 5/1998 | Sheerin | 379/88.22 |
| 5,768,513 A | 6/1998 | Kuthyar et al. | 709/204 |
| 5,771,281 A | 6/1998 | Batten, Jr. | 379/93.23 |
| 6,301,338 B1 * | 10/2001 | Makela et al. | 379/88.17 |
| 6,327,346 B1 * | 12/2001 | Infosino | 379/88.02 |
| 2001/0050977 A1 * | 12/2001 | Gerszber et al. | 379/88.13 |

* cited by examiner

*Primary Examiner*—Fan Tsang
*Assistant Examiner*—Ovidio Escalante

(57) ABSTRACT

A method and system for personalized multimedia messaging include multiple communication mode interfaces which enable the system to communicate with multiple types of communication devices. Caller profiles are configured for preselected callers such that each caller profile includes at least one caller identifier representative of data patterns in incoming. calls received over the communication modes. The caller profiles are selectively configured to include personalized messages intended for a subset of the preselected callers and can also include caller identity verification data. A caller identification subsystem monitors the communication modes for incoming calls which include the data patterns. Upon detecting one of the data patterns, a processor accesses a corresponding caller profile and determines if the caller profile includes a personalized message. If a personalized message includes confidential subject matter, the processor can transmit a caller identity verification request to the incoming caller. The processor compares received caller identity verification data to stored caller identity verification data. If the received verification data matches the stored verification data, the messaging system transmits the personalized message to the caller. If no personalized message is associated with the caller profile, a general message is transmitted to the caller, which might include a greeting that directs the caller to leave a message. In a preferred embodiment, the personalized messaging system is included in an IVR system which enables callers to interface with the IVR system through multiple different communication modes based on the same set of personalized caller preferences.

20 Claims, 4 Drawing Sheets

SYSTEM AND METHOD FOR PERSONALIZED MULTIMEDIA MESSAGING

BACKGROUND OF THE INVENTION

The present invention relates generally to systems and methods for providing telecommunications messaging capabilities and, more specifically, to a system and method for providing personalized messaging in a multimedia environment.

DESCRIPTION OF THE RELATED ART

With the popularization of answering machines, telecommunications systems have placed an increasingly high premium on telecommunications messaging. One of the challenges which telecommunications messaging has attempted to overcome is how to provide personalized messaging for incoming calls based on the identity of the caller. For example, answering machines generally allow a user to record a single message which is played back as a greeting for all unanswered calls. If the user wishes to provide a specific message to a particular caller, the user must record a personalized message which is then transmitted in each unanswered call, not just to the targeted caller. Indiscriminate transmission of a personalized greeting can be particularly undesirable if the greeting includes confidential subject matter. Another problem which messaging systems have attempted to solve is how to provide a particular caller with the same personalized message regardless of the mode of communication (e.g., telephone or electronic mail) through which the caller is attempting to communicate.

A partial solution to these problems is presented in U.S. Pat. No. 5,748,709 to Sheerin, which describes a programmable answering machine having multiple storage devices, or mailboxes. The answering machine includes a processor which is configured to utilize caller identification (caller ID) data associated with incoming calls to route the incoming calls to appropriate mailboxes. The processor executes a control program which can be configured to recognize particular caller ID numbers and associate the caller ID numbers with particular mailboxes. In this manner, a caller ID number which is associated with a particular mailbox having a preselected message will be automatically routed to that mailbox. The Sheerin answering machine is configured to provide messaging only for incoming telephone calls. An individual attempting to contact a called party by a communication mode other than by telephone will not receive the preselected message, because the Sheerin answering machine is unable to interface with communication modes other than public switch telephone network (PSTN) telephony. Furthermore, because the answering machine relies solely on caller ID, the answering machine is only able to route a call to a particular mailbox based on the identity of the calling telephone, not the personal identity of the individual operating the telephone.

U.S. Pat. No. 5,768,513 to Kuthyar et al. describes a multimedia messaging system wherein the calling party, during call setup, transmits a request to initiate a multimedia call to a multimedia bridge which includes the called party's number and the number of a message server. If the call goes unanswered, the multimedia bridge initiates a call to the message server, which organizes mailbox functions according the numbers of called parties. The call request from the multimedia bridge to the message server includes the called party's number, which is utilized by the message server to access the appropriate multimedia greeting. Because the message server is not configured to access the appropriate multimedia greeting based on the identity of calling parties, the message server is not configured to selectively transmit personalized multimedia greetings to callers.

A need remains for a messaging system which is capable of providing personalized messaging based on a caller's identity and which is capable of providing the personalized messaging over multiple communication modes.

SUMMARY OF THE INVENTION

A method and system for personalized multimedia messaging include a caller identification subsystem for determining caller identity in calls received over multiple different communication modes and a processor for accessing messages for transmission to callers based on the determined caller identity. Consequently, if the messaging system has been configured to transmit a personalized message to a preselected caller, that caller will receive the same personalized message regardless of the communication mode utilized in attempting to contact the called party.

In a preferred embodiment, the messaging system includes interfaces for communication utilizing a public switch telephone network (PSTN), internet protocol (IP) telephony, and electronic mail (e-mail). The interfaces enable the multimedia messaging system to receive e-mail transmissions, IP telephony calls, and PSTN calls, which may include any or all of telephone calls, pager transmissions, and modem transmissions. Caller profiles are configured which include caller identifiers associated with preselected callers. The caller identifiers are representative of data patterns of transmissions from communication devices utilized by the associated callers. For example, the caller identifiers include e-mail addresses, IP addresses, and automatic number identifiers (ANIs) and caller identity verification data. A caller profile for a particular caller might include an e-mail address associated with the caller's e-mail account, a home telephone ANI, a cellular phone ANI, an IP address associated with a telephony enabled computer, and a caller identity verification code. Each caller profile further includes data indicating whether a called party has recorded a personalized message for the caller.

A caller identification subsystem monitors the different communication modes for the data patterns associated with communications from the preselected callers. Upon detecting a data pattern associated with one of the caller identifiers, a processor accesses the corresponding caller profile to determine whether there is a prerecorded personalized message intended for the caller. If the caller profile includes an indication of a personalized message, the processor accesses the message for transmission to the caller. If the caller profile does not include a personalized message, the processor accesses a general message. In this manner, the caller will receive the same personalized message from the messaging system regardless of the specific communication mode the caller utilizes.

The identification subsystem preferably includes a caller identity verification function. If the subject matter of a personalized message includes sensitive or confidential subject matter, it is desirable to verify that the user of a particular communication device is the preselected caller for which the message is intended. The verification function can be performed by a voice recognizer and/or an authorization code processor. If it is determined that identity verification is required, a request can be transmitted to the caller for either a voice sample (e.g., "please state your name") or an authorization code (e.g., "please enter your ID code now").

Alternatively, an authorization code can be included in an initial communication from a caller, for example, within the body of the caller's e-mail message. The identification verification subsystem can also be utilized to enable callers to determine whether they have a personalized message, if they are calling from a communication device which is not recognized by the messaging system. For example, if the caller is calling from a payphone, upon entering a password or providing a voice sample, the message accessing processor accesses the personalized message for the caller, if one exists.

The system also includes a mode controller, which selects a suitable mode from among the communication modes to transmit the general message or an appropriate personalized message. Each of the modes is associated with a suitable device for transmitting message data.

In a preferred embodiment, the personalized messaging system is incorporated into a multimedia interactive voice response (IVR) system which includes multiple IVR mailboxes. The IVR mailboxes include personalized mailboxes having personalized greetings for preselected callers, menu mailboxes with menu selection messages, informational mailboxes with informational messages, and a generalized greeting mailbox. The generalized greeting mailbox includes a greeting which provides an entry into the IVR system to first-time callers. The personalized greetings in the personalized mailboxes provide preselected callers with a predetermined menu of options of informational mailboxes and/or menu selection mailboxes from which to select. In one embodiment, the composition of the menu of options in the personalized mailboxes is at least partially determined by prior IVR sessions.

The IVR system includes multiple caller profiles, which include caller identifiers representative of data patterns associated with calls from the preselected callers, as received over multiple communication modes. Caller preferences are entered to indicate preferences of preselected callers for particular ones of the IVR mailboxes. The ability to enter preferences can be utilized to provide the callers with the option of returning to previously visited mailboxes. Alternatively, the caller preferences can be based on information obtained independently of caller interaction with the IVR system.

A caller identification subsystem monitors incoming calls received over the communication modes for the data patterns associated with the preselected callers. Upon detection of one of the data patterns by the identification subsystem, a processor accesses a designated IVR mailbox according to the caller preferences. Multiple mode interfaces are provided for transmitting data from the mailboxes over the communication modes to the preselected callers.

DETAILED DESCRIPTION

Figure 1:
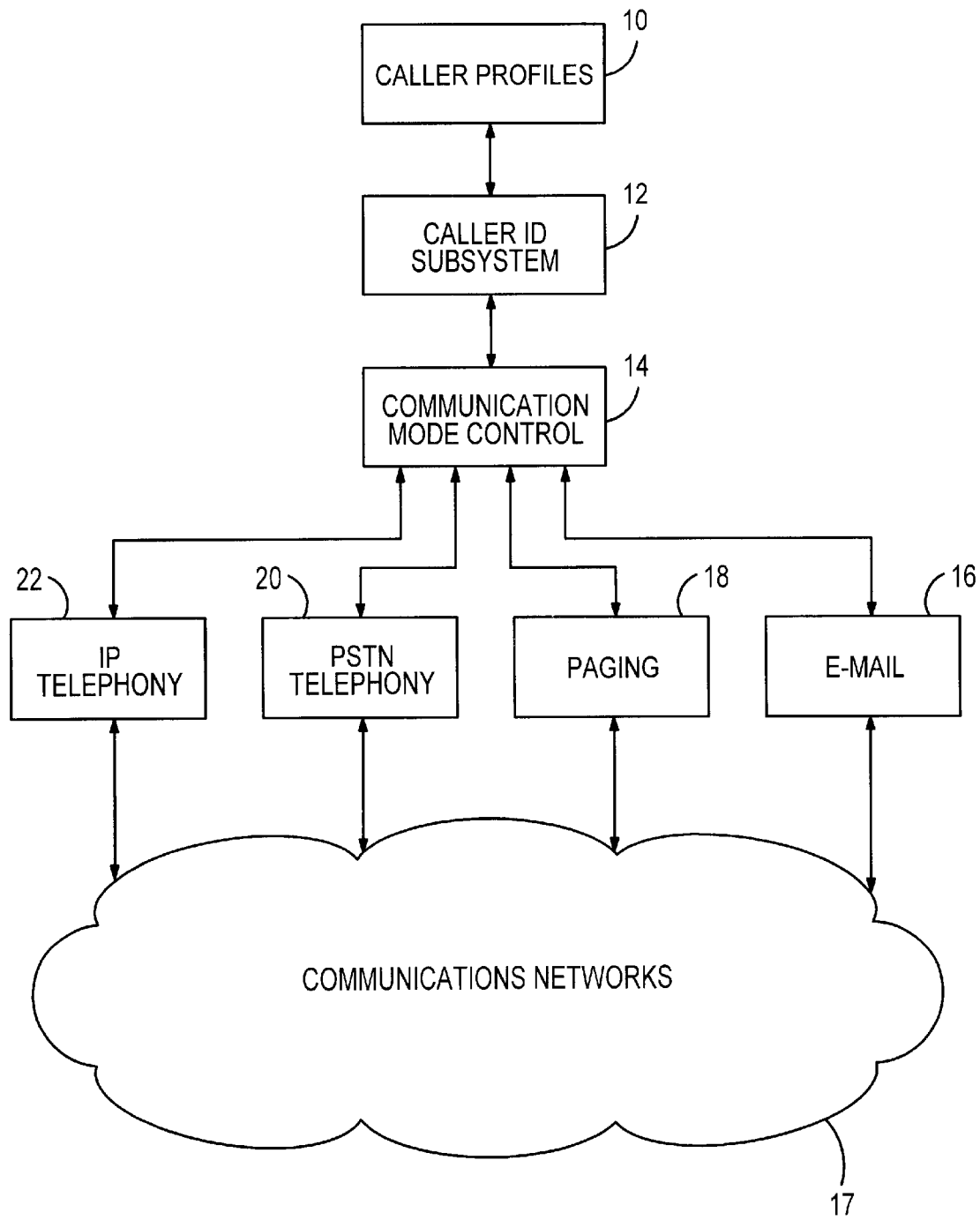
FIG. 1 is a high level block diagram of a multimedia messaging system according to the present invention.

With reference to FIG. 1, a multimedia messaging system is adapted for performing personalized messaging utilizing multiple communication modes. The communication modes include IP telephony 22, which preferably includes video telecommunications; PSTN telephony 20, including digital, analog, wireless, and landline telephony; paging 18; and e-mail 16. Of course, these communication modes are not mutually exclusive. For example, an e-mail message can be transmitted over the PSTN, or it can be transmitted over a data network, such as a LAN. The communications network cloud 17 represents multiple voice and data networks utilized by communication devices in attempts to communicate with a called party.

A communication mode control 14 selects a mode which will be utilized to transmit an outgoing message to a caller. The terms "call" and "caller" as used herein generically describe an attempted communication with a called party communication device and the individual attempting the communication, respectively. The mode selected to transmit an outgoing message to a caller is not necessarily the same mode utilized by the caller in the attempt to establish a call to the called party. For example, the caller might attempt to transmit a fax to the called party and the messaging system might, in response, transmit an e-mail message to the caller.

A caller identification (ID) subsystem 12 is configured to detect data patterns associated with communication attempts from callers. The caller ID subsystem 12 can be configured to recognize data transmission patterns from multiple different caller communication devices, allowing the patterns to be used to identify the source of a transmission. For example, the caller ID subsystem might be configured to recognize an automatic number identifiers (ANI), caller e-mail addresses, and IP addresses of computers enabled for IP telephony.

Caller profiles 10 are configured to enable a system user to associate particular caller devices to personalized messages intended for preselected callers. Each profile corresponds to a preselected caller and may include multiple transmission data patterns, with each transmission data pattern corresponding to a particular caller device. For example, a profile for a particular caller might include an automatic number identifier (ANI) associated with a cellular phone, an IP address assigned to a network computer, and an e-mail address assigned to the caller. Each caller profile can be configured to include a personalized message which is intended solely for transmission to a particular caller. With this configuration, a caller will receive the same personalized message from the messaging system when utilizing any of the communication devices which have corresponding transmission data patterns in a caller profile.

Figure 2:
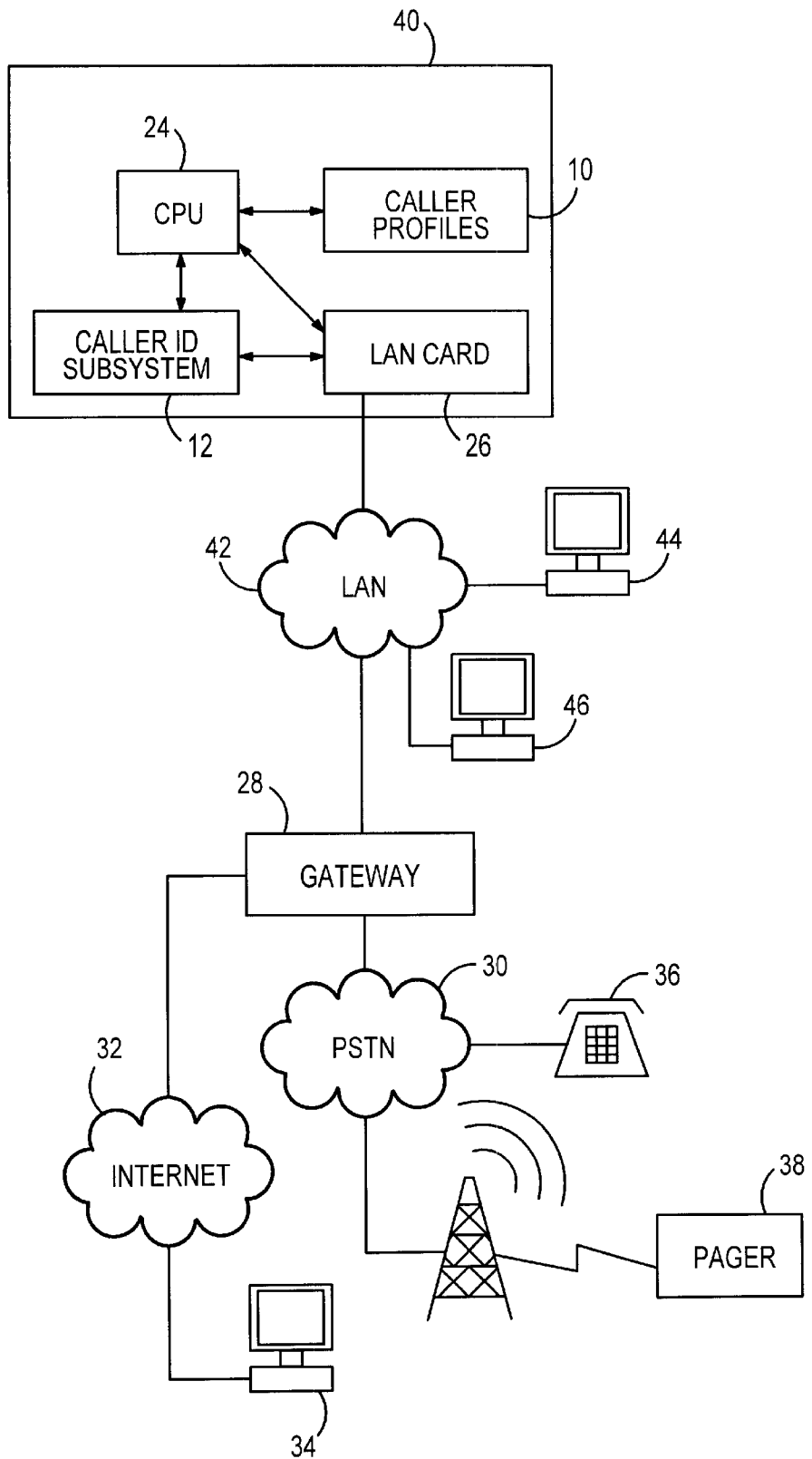
FIG. 2 is a first embodiment of the multimedia messaging system shown in FIG. 1 wherein the system is located within a data network.

The messaging system can be located at any one of a number of locations, including a central office of a PSTN, a private branch exchange, or a network server of a data network. The precise equipment with which the messaging system is associated is not critical, as long as the messaging system has access to multiple communication modes. Referring to FIG. 2, in one embodiment the messaging system is located in a network messaging server 40 on a data network such as a LAN 42. A gateway 28 enables the network messaging server 40 to communicate with various devices on a PSTN 30, such as a pager 38 and a telephone 36. The gateway 28 also enables the messaging server 40 to communicate with a first computer 34 via the global communications network known as the Internet 32. The messaging server includes a LAN card 26 which enables the messaging server to communicate with the gateway 28 and with second and third IP telephony enabled computers 44 and 46 on the LAN 42. The second computer 44 is assigned to the called party and is configured to transfer unanswered calls to the messaging server 40 after a predetermined time interval.

Caller profiles 10 are stored in memory and include multiple data transmission patterns associated with caller communication devices. Although the caller profiles 10 are shown as being stored in memory within the server 40, they can alternatively be included in a remotely located database, or they can be distributed within various memory devices on the network. The caller profiles can include personalized messages which are to be transmitted to preselected callers For example, assume that the third computer 46 is an office computer assigned to a caller and that telephone 36 is a home telephone of the caller. A caller profile associates an IP address assigned to third computer 46 and an ANI assigned to telephone 36 with a personalized message for the caller stored in memory.

The caller identification subsystem 12 is configured to monitor data received via the LAN card 26 for the data transmission patterns, including the third computer IP address, the telephone ANI, and the e-mail address associated with the first computer 34. Upon detection of one of the data transmission patterns by the caller identification subsystem 12, a central processing unit (CPU) 24 accesses the personalized message in the corresponding caller profile for transmission to the caller. Regardless of whether the caller utilizes e-mail, IP telephony or PSTN telephony, the CPU accesses the same personalized message. For example, if the caller transmits an e-mail message to the called party when the second computer 44 is configured to relay all communications to the messaging server 40, the caller identification subsystem will recognize the caller's return e-mail address in the e-mail message. The CPU 24 will access the personalized message in the caller's profile for transmission to the caller in response to detection of the e-mail address. Furthermore, the CPU 24 will access the same personalized message from memory in response to detection of the ANI assigned to the telephone 36 in a phone call or detection of the third computer IP address during setup of an IP telephony call from the third computer 46.

The CPU 24 can be configured to transmit the personalized message only once, and thereafter to transmit a general message which includes a greeting such as, "I am not currently available. Please leave a message." The CPU 24 continues to access the general message until the called party reconfigures the caller profile to include another personalized message. If the caller profile does not include a personalized message, the general message is selectively transmitted to the caller when the caller uses specific modes in attempting to contact the called party. For example, if the caller places a PSTN telephony call from telephone 36 or an IP telephony call from the third computer 46, the CPU 24 will access the general message to allow the caller the opportunity to record a message for the called party.

However, the general message is not accessed by the CPU 24 for transmission to the caller if the caller identification subsystem detects the caller's e-mail address in a transmission from the first computer 34, because the caller does not need to be instructed to leave a message if he is already transmitting an e-mail message.

The messaging system does not always transmit a message to the caller utilizing the same communication mode that the caller utilized in the attempted call. For example, assume that telephone 36 is enabled to transmit and receive faxes and that the second computer 44 is provided with facsimile capability as well. When the caller transmits a fax from telephone 36 to the second computer 44, the call is transferred to the messaging server 40. If the caller profile includes a personalized message, it might not be desirable to transmit the personalized message to telephone 36 in the form of a fax. Alternatively, the messaging server may be programmed to transmit the personalized message to the caller in the form of an e-mail message to the first computer 34 or to the pager 38.

If a personalized message includes sensitive confidential information, it may not be sufficient to rely on the identification of the communication device to ascertain that the personalized message is being transmitted to the caller for which it was intended. For example, if a co-worker of the user of the third computer 46 places an IP telephony call to the second computer 44, the co-worker will have unintended access to the personalized message, if the caller identification subsystem relies only on the IP address of the third computer 46 in determining which message to transmit.

In a preferred embodiment, the caller identification subsystem 12 includes a caller identity verification function which can be performed either by speech recognition or an authorization code comparison. If a personalized message includes confidential subject matter, the called party configures the caller profile to include a requirement for caller identity verification data which is uniquely associated with the anticipated caller. The CPU 24 responds to detection of one of the data transmission patterns by the caller identification subsystem (e.g., a telephone call having a particular ANI) by accessing the request for verification from memory for transmission to the communication device from which the call was placed. The caller identification subsystem 12 then compares the caller's response which includes a personalized verification code, to stored verification data to determine whether the user of the communication device is the preselected caller intended to receive the personalized message.

Verification data might consist of an alpha-numeric code which is uniquely assigned to the anticipated caller. Upon detecting a caller's e-mail address, the caller identification subsystem 12 searches the e-mail message for the presence of an alpha-numeric code. If the caller utilizes telephone 36 to make the call, the identification subsystem 12 transmits a code request to the caller and the caller responds by transmitting the code in the form of dual tone multi-frequency tones. The identification subsystem compares the received alpha-numeric code to the stored alpha-numeric code to verify the caller's identity. For voice calls, the caller identity verification request might include a request for the caller to say his name over the connection. A speech-to-text conversion function (not shown) in the identification sub-system 12 converts the received speech to text and compares the text of the caller response to the text of the name of the authorized caller to determine if the caller is the authorized caller.

Alternatively, for voice calls, the verification data might consist of a voice sample of the caller. A verification request includes a request for a voice sample which the caller identification subsystem 12 compares to a stored voice sample to verify the identity of the caller. Only if the transmitted voice sample matches the verification data voice sample is the personalized message transmitted over the voice call. Both the general message and the personalized messages prompt the caller to record an incoming message, which the called party is subsequently able to access.

A personalized message recorded by the called party for transmission to a particular caller will be transmitted to the caller regardless of the communication mode utilized by the caller to contact the called party.

For example, the recorded message might be recorded in the form of a text message. If the caller utilizes telephone 36 in an attempt to contact the called party, the outgoing voice message will be transmitted after converting the format of the text message to a voice format. If the caller transmits an e-mail message to the called party, the text message is transmitted to the caller as text in an e-mail message without performing a format conversion.

Figure 3:
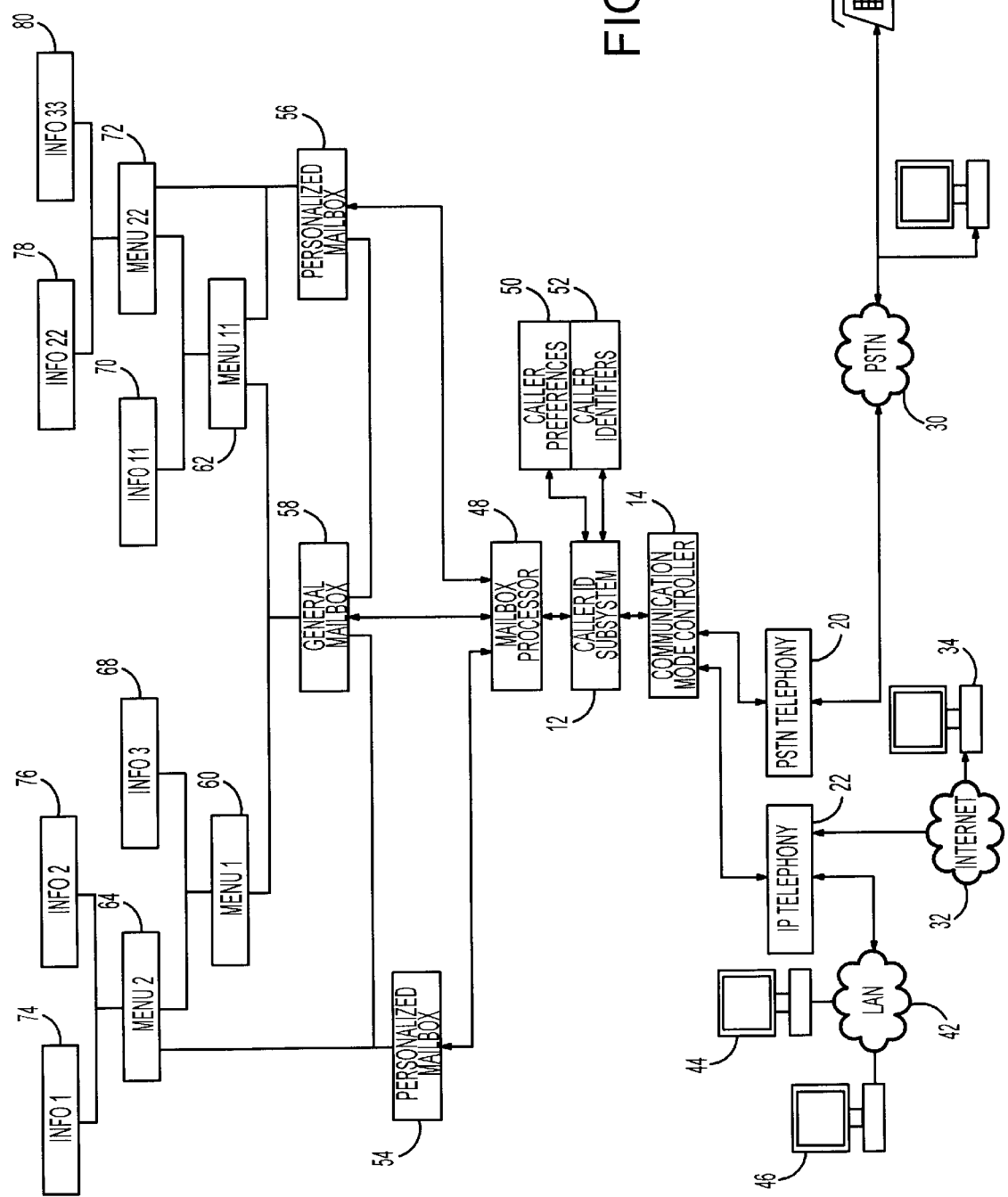
FIG. 3 is a second embodiment of the system of FIG. 1 wherein the system is employed in an interactive voice response (IVR system).

With reference to FIG. 3, in a preferred embodiment, the multimedia messaging system is employed within an interactive voice response (IVR) system. The multimedia IVR system enables callers to access the IVR system from any of multiple communication devices and to interface with the IVR system based on the same set of stored caller preferences, regardless of which of the communication devices the caller utilizes. The multimedia IVR system includes first and second personalized mailboxes 54 and 56 which are associated respectively with first and second callers and which include personalized messages for the first and second callers. The first personalized mailbox 54 includes a message which prompts the first caller to select an entry point in the IVR system of either menu2 mailbox 64, or a general mailbox 58. Menu1 mailbox 60 provides the option of selecting from menu2 mailbox 64 or info3 mailbox 68. Menu2 mailbox 64 provides the option of selecting either info1 or info2 mailboxes 74 and 76, which are both terminal mailboxes. The general mailbox 58 is the default point of entry into the IVR system. Second personalized mailbox 56 includes a message which prompts the second caller to select from entering the IVR system at either menu11 mailbox 62, menu22 mailbox 72, or the general mailbox 58. Menu11 mailbox 62 prompts selection of either terminal info11 mailbox 70 or menu22 mailbox 72, which in turn prompts selection of either info22 mailbox 78 or info33 mailbox 80.

The menu options presented to first and second callers in the first personalized mailbox 54 and the second personalized mailbox 56 are determined by caller preferences 50 associated with the first and second callers. The caller preferences 50 can be automatically recorded based on a previous IVR session, or the preferences can be entered into the system by a system administrator prior to the first caller interaction with the IVR system. The multimedia IVR system includes IP telephony mode 22, and PSTN telephony mode 20. The communication mode controller 14 selects the mode over which an outgoing mailbox message is transmitted.

A first caller profile includes a first IP address assigned to the first computer 34, a first ANI assigned to the first telephone 36, and a first e-mail address associated with the third computer 46. A second caller profile includes a second IP address associated with a second computer 44. The caller identification subsystem monitors incoming calls for data transmission patterns associated with the first and second caller profiles. Upon detecting one of these data transmission patterns, the caller identification subsystem 12 causes a mailbox processor 48 to access the appropriate mailbox. For example, if the first caller utilizes the first computer 34 to initiate a first IVR session, the caller identification subsystem 12 will recognize the first IP address and, based on first caller preference data, will access the first personalized mailbox 54. First mailbox voice data, which includes the option to select from menu2 mailbox 64 or the general mailbox 58, is transmitted to the first computer 34 via the IP telephony mode 22. The caller preferences of the first caller can be reconfigured upon termination of the IVR session in response to selections made by the first caller. If the first caller initiates a second IVR session utilizing first telephone 36, upon recognizing the first ANI assigned to the first telephone, the caller identification subsystem 12 will access the reconfigured first caller preference data, and the IVR system will provide the first caller with the option of continuing with the first IVR session or starting a new session.

If a call is received by the IVR system and the caller identification subsystem 12 is unable to recognize any data transmission patterns associated with stored caller profiles, the mailbox processor 48 accesses the general mailbox 58 and transmits a general mailbox message to the unidentified caller. A new caller profile can be configured for the unidentified caller, which includes a transmission pattern associated with the communication device utilized in the IVR session. The IVR system transmits a query to the previously unidentified caller to determine if there are any other communication devices which should be included in the caller profile. If there are other communication devices, the new caller profile can be configured to include data transmission patterns associated with these additional devices.

If the first and second personalized mailboxes include sensitive confidential data, it may be desirable to ascertain the actual identity of the caller in addition to identifying the calling communication device. As in the multimedia messaging system shown in FIG. 2, the caller identification sub-system of the multimedia IVR system can include caller identity verification functions. The caller identity verification can be based on an authorization code uniquely assigned to a particular caller and/or a voice data comparison which regulates access by requiring a caller to provide a voice sample which matches a stored voice sample in one of the caller profiles.

Figure 4:
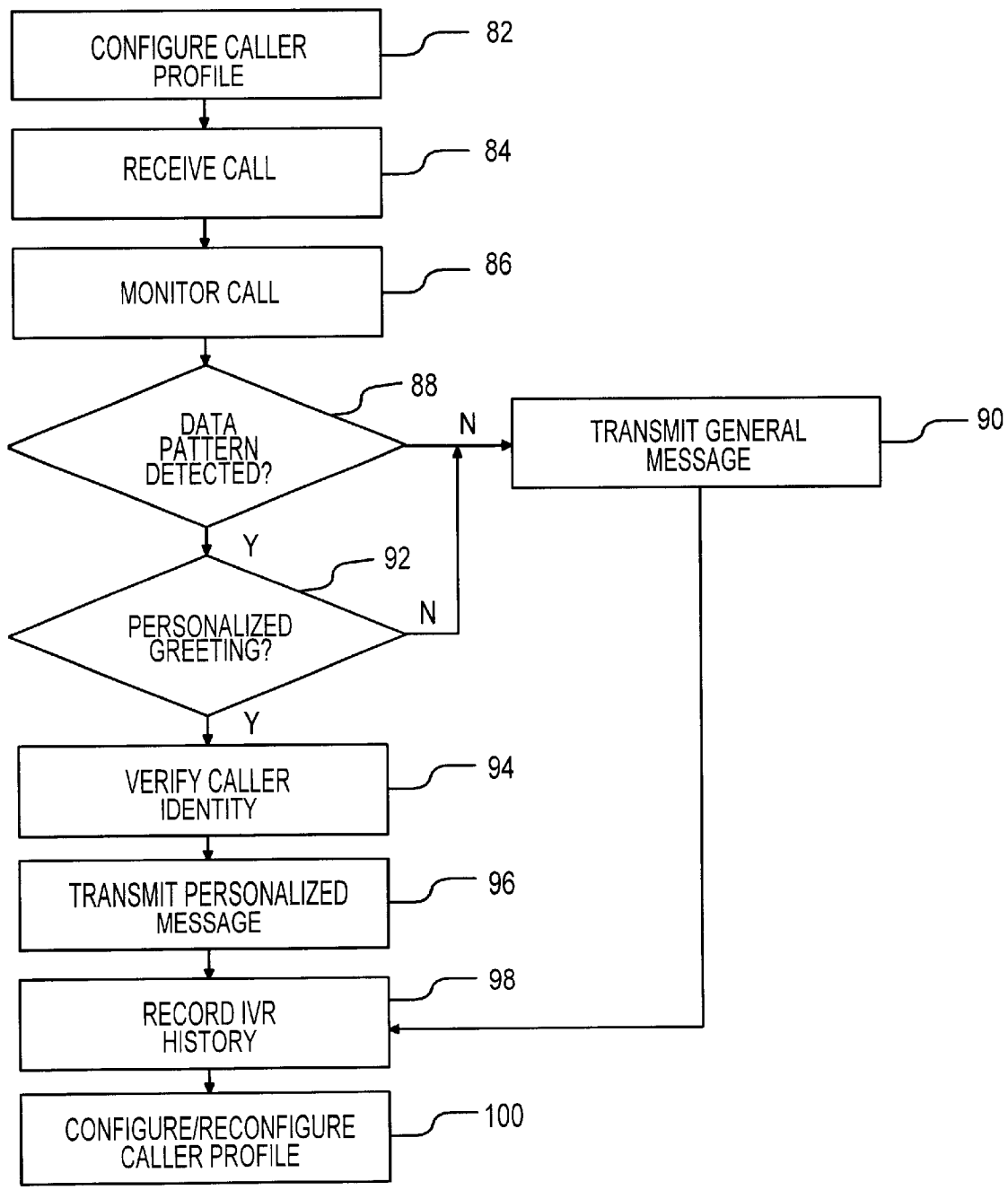
FIG. 4 is a method of providing personalized messaging utilizing the multimedia messaging system of FIG. 2 or FIG. 3.

With reference to FIGS. 2, 3, and 4, a method for providing personalized multimedia messaging includes the step 82 of configuring multiple caller profiles. Each caller profile includes caller identifiers representative of data transmission patterns which correspond to particular caller communication devices associated with a preselected caller. A typical caller profile might include caller identifiers representative of an IP address assigned to a first computer, an ANI assigned to a telephone, and an e-mail address associated with a second computer, with the first computer, the telephone, and the e-mail address all being operated by or assigned to the preselected caller. In the multimedia IVR embodiment, the caller profiles also include caller preferences that dictate a menu selection from a number of IVR mailboxes. Each of the caller profiles represents a set of communication devices utilized by a particular caller.

In step 84 a call is received which might be either an IP telephony call, an e-mail transmission over a data network, or a PSTN telephony call, such as a fax or a voice call. The call is monitored in step 86 for a data transmission pattern associated with a caller identifier in one of the caller profiles. In decision step 88, if no data transmission pattern is identified at the outset of the call, a general message is transmitted to the caller as indicated by step 90. In the messaging system embodiment shown in FIG. 2, the general message includes a greeting to the effect that the called party is not available to reply to the call and to please leave a message. In the IVR embodiment, the general message is included in the general mailbox 58 and it prompts the caller to select from menu options of Menu1 mailbox 60 and menu 11 mailbox 62. The mailbox processor 48 logs an IVR history in step 98, which represents the mailbox selections made by the caller in an IVR session. Based on the IVR session history, in step 100 the caller identification subsystem 12 configures the caller preferences associated with the caller to enable the caller to resume the IVR session in a subsequent call.

If in step 88 a data transmission pattern associated with one of the caller profiles is detected, it is determined in step 92 whether the caller profile includes a personalized message. If the caller profile includes a personalized message, the identity of the caller can be verified in step 94, when the subject matter of the personalized message is intended to be confidential. The verification can be performed by requesting a reply transmission that identifies an authorization code instance (e.g., an alpha-numeric code). The transmitted code is compared to the stored code to verify the identity of the caller. Alternatively, the verification can be performed by requesting a voice sample from the caller, which is then compared to a voice sample stored in the caller profile.

If the caller identity verification step is performed and the caller identity is verified, the personalized greeting is transmitted to the caller in step 96. In the multimedia messaging embodiment of FIG. 2, the personalized message can include an outgoing message followed by an instruction to record an incoming message. Alternatively, a primary outgoing message can prompt the caller to select from one of several subjects, each subject having an associated secondary message. For example, the primary message might request a sales person to select from secondary messages associated with multiple different sales accounts. Upon selection of one of the secondary messages, the selected secondary message is transmitted to the caller. Each subsequent incoming call by the caller from a communication device associated with a caller identifier 52 that is stored in the caller profile of the caller will be automatically recognized, and the messaging system will automatically transmit a personalized message to the caller, if a personalized message is associated with the caller's profile.

In the multimedia IVR embodiment of FIG. 3, the personalized message is associated with a personalized mailbox, for example first personalized mailbox 54, and the message includes a prompt for the caller to select from menu I mailbox 62 or menu22 mailbox 72. In step 98, the mailbox processor 48 records the mailbox selections made by the caller and at the conclusion of the current IVR session in step 100, the call identification subsystem 12 reconfigures the caller profile based on mailbox selections during the IVR session to allow the caller to resume the session in a subsequent call. The subsequent call can be made by the caller utilizing any of the communication modes which have corresponding identifiers 52 in the caller profile. Consequently, the user can interface with the IVR system in a first session through the PSTN telephony mode 20 and subsequently resume the first IVR session by interfacing with the IVR system in the IP telephony mode 22.

What is claimed is:

1. A method for performing personalized multimedia messaging based on identities of callers comprising the steps of:
   assigning caller profiles to selected callers, including configuring each caller profile to include message data intended for transmission to a selected caller, each caller profile further including at least one caller identifier that is indicative of reception of an incoming communication from said selected caller, at least some of said caller identifiers being specific to calling devices and at least some of said calling devices being mutually incompatible with respect to communication modes for operating said calling devices, said communication modes including at least one voice-specific mode and at least one text-specific mode;
   receiving incoming communications from said calling devices over said communication modes;
   monitoring said incoming communications for data patterns which are indicative of said calling devices;
   accessing a selected one of said caller profiles upon detecting a particular data pattern based on a correspondence between said particular data pattern and a caller identifier that is included in said selected caller profile;
   selecting one of said communication modes for transmitting said message data included in said selected caller profile, said selecting being based on at least one of said selected call profile and said detecting of said particular data pattern;
   converting at least a portion of said message data included in said selected caller profile from a first format to a second format when it is determined that said first format is incompatible with a transmission in said selected communication mode; and
   transmitting said at least a portion of said message data included in said selected caller profile, said transmitting being in said selected communication mode.

2. The method of claim 1 further comprising a step of configuring a general message to be transmitted as a default message for incoming communications for which there is no stored personalized message.

3. The method of claim 2 further comprising the steps of:
   determining whether said selected caller profile includes a first personalized message;
   transmitting said first personalized message over a communications network if said selected caller profile includes said first personalized message; and
   if said selected caller profile does not include said personalized message, transmitting said generalized message over said communications network.

4. The method of claim 1 wherein said step of configuring said caller profiles includes configuring first caller identifiers representative of caller e-mail addresses, configuring second caller identifiers representative of automatic number identifiers, configuring third caller identifiers representative of caller IP addresses, and configuring caller identity verification data.

5. The method of claim 4 wherein said step of monitoring said incoming communications includes:
   monitoring said incoming communications for one of said e-mail addresses, said automatic number identifiers, and said caller IP addresses; and
   transmitting requests for said caller identity verification data to verify identities of said preselected callers;
   comparing caller identity verification data received over said incoming communications to caller identity verification data in said caller profiles; and
   transmitting said personalized messages to said selected callers if said received caller identity verification data matches said caller identity verification data.

6. The method of claim 5 wherein said step of transmitting said requests for said caller identity verification data includes one of transmitting requests for voice samples and transmitting requests for access codes.

7. The method of claim 1 further comprising a step of storing informational messages and storing menu messages which prompt said selected callers to select from one of multiple menu options or one of said informational messages, said step of configuring each of said caller profiles including formatting presentation of said menu messages to said selected caller.

8. A system for personalized multimedia messaging comprising:

connectivity means for enabling a plurality of alternative communication modes for providing local access to and from remote communication devices;

memory having stored personalized messages which are individually associated with caller identifiers that are specific to anticipated sources of incoming communications, each said personalized message having content intended for a particular caller;

a caller identification subsystem configured to detect said caller identifiers of incoming communications from said remote communication devices over any one of said plurality of communication modes;

means, responsive to said caller identification subsystem, for accessing said memory to select a specific personalized message in response to detection of a specific caller identifier, said specific personalized message being associated with said specific caller identifier in said memory; and means for transmitting said specific personalized message in a format compatible with a selected one of said communication modes, said means for transmitting being cooperative with said means for accessing to convert said content of said specific personalized message to said format in response to determining that said content is stored in said memory in a format compatible with an unselected one of said communication modes but incompatible with said selected one of said communication modes.

9. The system of claim 8 wherein said connectivity means is compatible with receiving said incoming communications in formats that include telephony over a public switch telephone network (PSTN), electronic mail (e-mail), and internet protocol (IP) telephony.

10. The system of claim 9 wherein said caller identification subsystem is configured to detect said caller identifiers based on e-mail address recognition, automatic number identification (ANI), and IP address recognition, at least some of said personalized messages being associated with a plurality of said caller identifiers.

11. The system of claim 8 wherein said caller identification subsystem has a first operational state configured to perform preliminary caller identifications of said incoming communications based on identifying a particular one of said remote communication devices and has a second operational state configured to perform a caller identity verification for particular individuals operating said remote communication devices.

12. The system of claim 11 wherein said caller identification subsystem includes one of a speech verification processor configured to compare received voice samples with stored voice samples and a code verification processor configured to compare a received verification code to a stored verification code, said speech verification processor and said code verification processor being selectively enabled during said second operational mode.

13. The system of claim 8 wherein said memory further includes a stored general message, said means for accessing being configured to access said general message in response to an incoming communication for which said caller identification subsystem detects no caller identifier for which there is a stored personalized message.

14. The system of claim 8 wherein said memory includes menu option prompts associated with particular ones of said caller identifiers such that accessing said menu option prompts is at least partially dependent upon detecting said particular ones of said caller identifiers.

15. A multimedia interactive voice response (IVR) system comprising:

a plurality of IVR mailboxes, including first mailboxes having stored personalized greetings to preselected callers, second mailboxes having stored menu selection messages, third mailboxes having stored informational messages, and a general mailbox having a stored generalized greeting;

a plurality of caller profiles having:
  a) a plurality of caller identifiers representative of data patterns associated with incoming calls from said preselected callers, said caller identifiers being associated with a plurality of alternative means for establishing connectivity; and
  b) caller preferences indicative of preferences of said preselected callers for particular ones of said IVR mailboxes;

a caller identification subsystem configured to monitor said plurality of means for establishing connectivity for said incoming calls which include said data patterns;

a processor configured to access particular ones of said IVR mailboxes according to said caller preferences in response to detection of specific said data patterns; and means for transmitting data from said plurality of mailboxes over each of said means for establishing connectivity.

16. The multimedia IVR system of claim 15 wherein one of said plurality of IVR mailboxes includes a request for caller identity verification, said caller identification subsystem including means for verifying identities of said preselected callers.

17. The multimedia IVR system of claim 15 wherein said verifying means is configured to verify said identities of said preselected callers based on a comparison of a received authorization code to a stored authorization code and a comparison of a received voice sample to a stored voice sample.

18. The multimedia IVR system of claim 17 wherein said means for verifying said preselected callers includes a code authorization processor and includes a speech analyzer.

19. The multimedia IVR system of claim 15 wherein said processor is configured to access said generalized greeting in the absence of detection of one of said data patterns by said caller identification subsystem.

20. The multimedia IVR system of claim 15 wherein said alternative means for establishing connectivity include IP telephony, PSTN telephony, and communication via pager transmissions.

* * * * *